United States Patent [19]
Park et al.

[11] Patent Number: 6,093,482
[45] Date of Patent: Jul. 25, 2000

[54] CARBON-CARBON COMPOSITE FOR FRICTION PRODUCTS AND METHOD OF MAKING SAME

[75] Inventors: Hyun Cheol Park; Hong Bum Lee; Ik Hyun Oh; Hyun Kyu Shin; Kwang Soo Kim; John Hyun Park, all of Kyongnam, Rep. of Korea

[73] Assignee: Daewoo Heavy Industries Ltd., Incheon, Rep. of Korea

[21] Appl. No.: 09/210,891

[22] Filed: Dec. 16, 1998

[51] Int. Cl.$^7$ .............................. B32B 18/00; C01B 31/00
[52] U.S. Cl. .................................... 428/293.4; 428/293.7; 428/367; 428/368; 428/408; 264/29.6; 508/103; 508/104; 508/105; 508/106
[58] Field of Search ...................... 508/103, 104, 508/105, 106; 264/29.6; 428/367, 368, 408, 293.4, 293.7

[56] References Cited

U.S. PATENT DOCUMENTS

| | | | |
|---|---|---|---|
| 4,983,451 | 1/1991 | Sugino et al. | 428/284 |
| 5,071,700 | 12/1991 | Sugino et al. | 428/283 |
| 5,205,888 | 4/1993 | Mochida et al. | 264/29.6 |
| 5,744,075 | 4/1998 | Klett et al. | 264/29.6 |
| 5,821,204 | 10/1998 | Kato et al. | 508/106 |
| 5,871,838 | 2/1999 | Klett et al. | 428/293.4 |

*Primary Examiner*—Jacqueline V. Howard
*Attorney, Agent, or Firm*—Staas & Halsey, LLP

[57] ABSTRACT

A carbon—carbon composite for friction products comprises an outer friction part and a load bearing structure part supporting the friction part. The friction part contains a mixture of carbon fibers, pitch powder and graphite powder, whereas the structure part is comprised of a pack of alternating layers of the mixture and layers of one member selected from the group consisting of carbon fabrics, carbon-based prepregs and carbon-based, segmented prepregs. The carbon—carbon composite is formed by way of aternatingly piling up layers of a mixture of carbon fibers, pitch powder and graphite powder and layers of one member selected from the group consisting of carbon fabrics, carbon-based prepregs and carbon-based, segmented prepregs one above the other to provide a preform, heating and pressing the preform within a mold to obtain a green body, carbonizing the green body to prepare a carbonized body, impregnating the carbonized body with pitch powder and recarbonizing the impregnated body, and subjecting the impregnated and recarbonized body to chemical vapor infiltration with hydrocarbon gas.

12 Claims, 2 Drawing Sheets

CARBON-CARBON COMPOSITE FOR FRICTION PRODUCTS AND METHOD OF MAKING SAME

FIELD OF THE INVENTION

The present invention is directed to a carbon—carbon composite for friction products such as a brake disc for use in air planes, high speed railroad vehicles, cars and the like. The invention also pertains to a method of making carbonic friction composites composed of a load bearing structure part and outer friction parts.

DESCRIPTION OF THE PRIOR ART

It is the knowledge of public domain that conventional carbonic composites consist of a carbonic reinforcing material and a carbonic matrix. Due to their inherent property of lightweight, high strength and increased heat conductivity, the carbonic composites are spotlighted in a frontier industry which often requires a new material of highly enhanced property. Among other things, the typical carbonic composites are of excellent wear resistance and thermal shock resistance and, therefore, may be advantageously applied to the brakes of a fighter plane and a large-sized aircraft. In addition, the carbonic composites have an improved high temperature strength, specific strength, chemical resistance and somatological adaptability, and can be utilized at a temperature of more than 3000° C. under an inert gas atomosphere. This enables the carbonic composites to find their use even in the field of a space shuttle leading edge, a rocket nozzle, an exit cone and a living body material.

In order for the carbonic composites to be used as a friction product, e.g., disc brake for aircrafts, high speed railroad vehicles and cars, they should exhibit an increased heat conductivity, an excellent wear resistance and a superior shock strength in addition to the properties as noted above. Since the heat conductivity means an ability to dissipate heat to the outside, the carbonic composites of higher heat conductivity can dissipate frictional heat within a shortened period of time, thus minimizing the chance of oxidation thereof which would otherwise be caused by the frictional heat. It also holds true that the greater the wear resistance and the shock strength, the longer the service life of the carbonic composites.

A drawback is encountered in the prior art carbon brake for an aircraft, that cracks or fractures are likely to occur at the groove of the carbon brake during the period of braking operation, which may be a major culprit in reducing the service life of the brake. It is however a well-settled theory that the fragments produced in the braking operation would form a thin film on the friction surface to thereby increase the wear resistance of the carbon brake. This means that it is of paramount importance to carefully select the composition and the element content of the carbonic composites in order to ensure an increased wear resistance thereof.

It has been the conventional practice that the carbonic composites for friction products are prepared by way of laminating or piling up carbon fabrics and segmented elementary carbon fibers, independently or in combination. In case of laminating the carbon fabrics alone, the heat conductivity in a direction perpendicular to the friction surface and the wear resistance of the friction surface are significantly reduced, although the heat conductivity in a direction parallel to the friction surface remains excellent. Use of the segmented elementary carbon fibers alone results in reduction of the heat conductivity and the shock strength, in spite of substantial improvement of the wear resistance. A method of piling up a pack of alternating layers of interwoven carbon fibers and layers of individual elementary fibers to form a carbon friction product is disclosed in U.S. Pat. No. 4,318,955 to Kulakov et al. While the resultant friction product exhibits excellent heat conductivity, wear resistance and shock strength, the method set forth in the '955 patent seems to be problematic in that it requires a time-consuming, repetitive process of densification.

U.S. Pat. No. 3,956,548 to Kovac et al teaches a carbonaceous aircraft brake disk having a reuseable lightweight carbon composite center core to which can be bonded lightweight composite wearing materials to each side. The wearing surface is particularly designed for wear loading applications, and is relatively thin thereby simplifying manufacturing and quality assurance steps. The center core is designed for long life and strength at relatively low cost. A carbon felt layer saturated with an adhesive is located between the center core and the lightweight side wear materials to form an integral disk upon pyrolizing of the adhesive.

It is important to note that the aircraft brake disk of the '548 patent consists of a center core and wear surfaces bonded to each other by bonding layers. No specific content of the elementary material is mentioned at all, making it difficult to practice the invention in a best mode.

SUMMARY OF THE INVENTION

It is an object of the invention to provide a carbon—carbon composite for friction products that exhibits increased heat conductivity, wear resistance and shock resistance.

Another object of the invention is to provide a method of making a carbon—carbon composite for friction products which can increase heat conductivity, wear resistance and shock resistance of the carbon—carbon composite, while assuring a shortened period of densification process.

One aspect of the invention resides in a carbon—carbon composite for friction products comprising: an outer friction part containing a mixture of carbon fibers, pitch powder and graphite powder; and a structure part supporting the friction part and containing a pack of alternating layers of said mixture and layers of one member selected from the group consisting of carbon fabrics, carbon-based prepregs and carbon-based, segmented prepregs.

Another aspect of the invention resides in a carbon—carbon composite for friction products comprising: an outer friction part containing one member selected from the group consisting of a carbon mat and a carbon felt, both of which are coated with pitch powder and graphite powder; and a structure part supporting the friction part and containing a pack of alternating layers of said one member and layers of carbon fabrics.

A further aspect of the invention resides in a method of making a carbon—carbon composite for friction products, comprising the steps of: alternatingly piling up layers of a mixture of carbon fibers, pitch powder and graphite powder and layers of one member selected from the group consisting of carbon fabrics, carbon-based prepregs and carbon-based, segmented prepregs one above the other to provide a preform; heating and pressing the preform within a mold to obtain a green body; carbonizing the green body to prepare a carbonized body; impregnating the carbonized body with pitch powder and recarbonizing the impregnated body; and subjecting the impregnated and recarbonized body to chemical vapor infiltration with hydrocarbon gas.

BRIEF DESCRIPTION OF THE DRAWINGS

The above and other objects, features, advantages of the invention will become apparent from a review of the following detailed description of the preferred embodiments taken in conjuction with the accompanying drawings, in which.

DETAILED DESCRIPTION OF THE PREFERRED EMBODIMENTS

Figure 1:
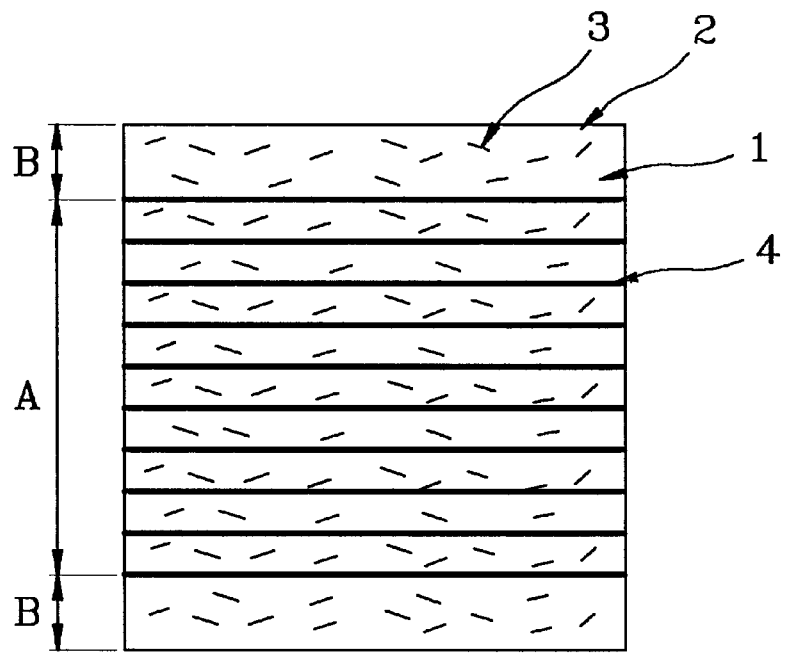
FIG. 1 is a partially broken away cross-sectional view illustrating a carbon—carbon composite for friction products according to the first embodiment of the invention.

Referring first to FIG. 1, it can be appreciated that a carbon—carbon composite for friction products in accordance with the first embodiment of the invention comprises outer friction parts B and a load bearing center structure part A which supports the friction parts. Each of the friction parts B contains pitch powder 1 and graphite powder 2 as matrix material and a plurality of segmented carbon fibers 3 mixed with the pitch and graphite powder 1, 2. In contrast, the structure part B consists of a pack of alternating layers of a mixture of pitch powder, graphite powder and segmented carbon fibers and layers of carbon fabrics 4.

In the preferred embodiment, the friction part B contains 10–70 wt % of segmented carbon fibers, 30–60 wt % of pitch powder and 5–40 wt % of graphite powder, while the structure part A contains 20–90 wt % of carbon fabrics, 10–70 wt % of segmented carbon fibers, 30–60 wt % of pitch powder and 5–40 wt % of graphite powder.

Preferably, the segmented carbon fibers 3 are 0.1–150 mm long, the pitch powder 1 has a particle size of no greater than 1.0 mm and the graphite powder 2 has a particle size of no greater than 0.1 mm. More preferably, the length of the carbon fibers 3 should be several tens of mm and the particle size of the pitch and graphite powder should be no greater than several μm. Typical examples of the carbon fabrics 4 include such woven carbon fabrics as plain fabrics, twill fabrics and satin fabrics.

In place of the carbon fabrics 4, it is equally possible to employ carbon-based prepregs, e.g., carbon fabrics of, for instance, no greater than 100 cm², which is impregnated with 5–60 wt % of pitch powder.

Figure 2:
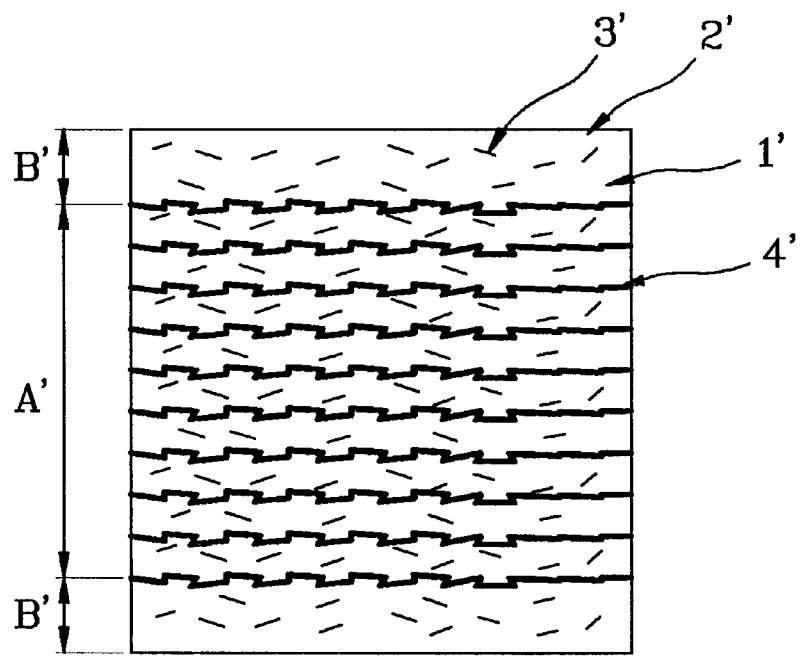
FIG. 2 is a view similar to FIG. 1 but showing a carbon—carbon composite for friction products according to the second embodiment of the invention.

FIG. 2 shows a carbon—carbon composite for friction products in accordance with the second embodiment of the invention which includes outer friction parts B' and a load bearing center structure part B'. As with the carbon—carbon composite shown in FIG. 1, each of the friction parts B' contains 10–70 wt % of segmented carbon fibers 3', 30–60 wt % of pitch powder 1' and 5–40 wt % of graphite powder 2'. The structure part A contains a pack of alternating layers of a mixture of segmented carbon fibers, pitch powder and graphite powder and layers of carbon-based, segmented prepregs 4. The prepregs 4 are segmented carbon fabrics impregnated with 5–60 wt % of pitch powder.

It would be preferred that the segmented carbon fibers 3' are 0.1–150 mm long, the pitch powder 1' has a particle size of no greater than 1.0 mm and the graphite powder 2' has a particle size of no greater than 0.1 mm.

In a modified embodiment, a carbon—carbon composite for friction products according to the invention includes outer friction parts containing one member selected from the group consisting of a carbon mat and a carbon felt, both of which are coated with pitch powder and/or graphite powder and a load bearing center structure part containing a pack of alternating layers of a carbon mat or a carbon felt and layers of carbon fabrics.

Figure 3:
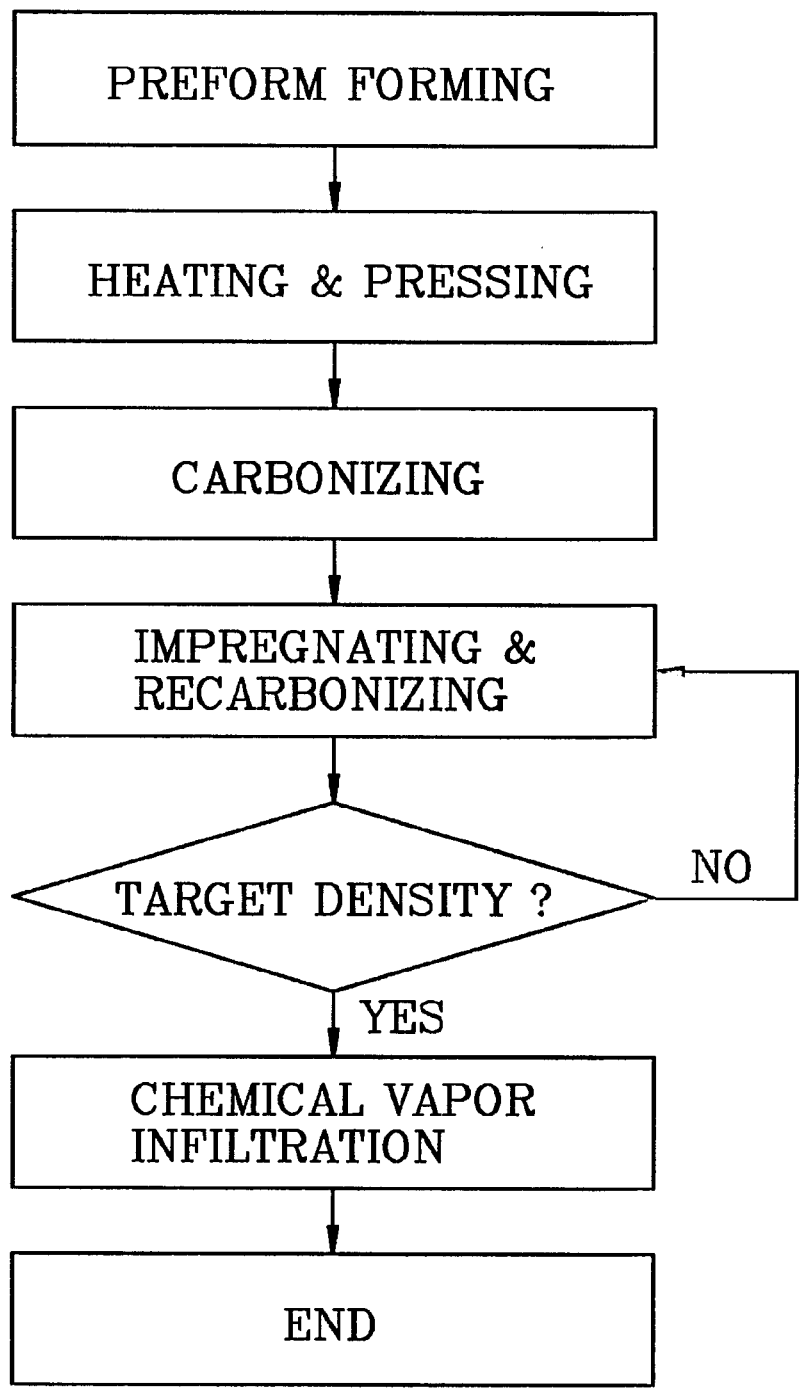
FIG. 3 is a diagram showing a method of making a carbon—carbon composite for friction products in accordance with the invention.

As can be appreciated in FIG. 3, the carbon—carbon composite for friction products set forth above can be prepared by way of alternatingly piling up layers of a mixture of carbon fibers, pitch powder and graphite powder and layers of carbon fabrics one above the other to form a preform. Alternatively, it is possible to use, in place of the carbon fabrics, carbon-based prepregs or carbon-based, segmented prepregs, e.g., carbon fabrics which is impregnated with pitch powder. The preform is heated and pressed within a mold to provide a green body which is then carbonized into a carbonized body. The next step is to impregnate the carbonized body with pitch powder and subsequently recarbonize the impregnated body. The impregnated and recarbonized body is subjected to chemical vapor infiltration with hydrocarbon gas or other like gas to produce a carbon—carbon composite as desired. It should be noted that the steps of impregnation and recarbonization can be repeatedly performed until and unless the resultant carbon—carbon composite reaches a predetermined target density.

In the afore-mentioned method of making a carbon—carbon composite, the carbon fibers are preferably segmented to have a length of 0.1–150 mm, the pitch powder is milled to have a particle size of no greater than 1.0 mm and, in a similar manner, the graphite powder is ground to have a particle size of no greater than 0.1 mm. The content of the segmented carbon fibers is 10–70 wt %, with the pitch powder 30–60 wt % and the graphite powder 5–40 wt %. The content of the pitch powder coated on the carbon fabrics to form a prepregs is in the range of 5-60 wt %.

The heating and pressing step is carried out within a mold at a temperature of 130–450° C., desirably 200–350° C. Furthermore, the step of carbonizing the green body is performed under an inert gas atmosphere, with a pressure of no greater than 20 bar and at a temperature of 700–2000° C. The recarbonization followed by the impregnation step is performed under an inert gas atmosphere, with an atomospheric pressure and at a temperature of 700–2000° C. The chemical vapor infiltration temperature is equal to or greater than 800° C.

Described below are working examples wherein carbon—carbon composites for friction products are prepared in accordance with the inventive method and a comparative example which is offered for the sake of comparison. It should be understood that the invention is not limited to the working examples which are presented for the purpose of description only.

WORKING EXAMPLE 1

Prepregs were first prepared by way of applying milled pitch powder on carbon fabrics and baking the pitch powder-impregnated carbon fabrics. A homogeneous mixture of 50 wt % of carbon fibers, 30 wt % of pitch powder and 20 wt % of graphite powder was alternatingly piled up with the prepregs to form a preform. The carbon fibers employed have a length of no greater than 1,0 mm, the pitch powder having a particle size of no greater than 0.1 mm and the graphite powder having a particale size of no greater than 0.02 mm.

The preform was loaded into a mold and then pressed at a temperature of 200–250° C. to provide a green body which is subsequently carbonized under an inert gas atomosphere, with a pressure of 1 bar and at a temperature of 1200° C. The carbonized body was impregnated with pitch powder and recarbonized three times, after which the impregnated and recarbonized body was subjected to chemical vapor infiltration with hydrocarbon gas at a temperature of 800° C. to thereby produce a high density carbon—carbon composite.

WORKING EXAMPLE 2

A carbon—carbon composite was prepared in the same manner as in Working Example 1, except that prepregs cut to have a size of 5×5 cm are used in place of the integral prepregs.

WORKING EXAMPLE 3

A homogeneous mixture of 50 wt % of carbon fibers, 30 wt % of pitch powder and 20 wt % of graphite powder was alternatingly piled up with carbon fabrics to form a preform. The preform was treated in the same manner as in Working Example 1, thus producing a carbon—carbon composite for friction products.

WORKING EXAMPLE 4

A mixture of 30 wt % of pitch powder and 20 wt % of graphite powder was uniformly deposited on carbon mats and carbon felts, either of which in turn was alternatingly piled up with carbon fabrics to provide a preform. The preform was treated in the same manner as in Working Example 1 to obtain a carbon—carbon composite for friction products.

COMPARATIVE EXAMPLE

A mixture of carbon fibers and pitch powder was alternatingly piled up with carbon fabrics to produce a preform. No graphite powder is contained in the mixture. The preform was treated in the same manner as in Working Example 1 except that the impregnation and recarbonization step was repeated five times, thus producing a carbon—carbon composite.

Physical properties of the carbon—carbon composites obtained in Working Examples 1 through 4 and the Comparative Example are shown in the following table.

TABLE

| | Graphite Content (wt %) | Recarbonization Times | Heat Conductivity (W/mK) | Shear Strength (MPa) | Wear Amount (μm/stod) | Density (g/cc) |
|---|---|---|---|---|---|---|
| W. Example 1 | 20.0 | 3 | V: 30–35<br>H: 90–95 | 90 | 0.8–1.0 | 1.81 |
| W. Example 2 | 20.0 | 3 | V: 30–35<br>H: 35–40 | 110 | 1.5–2.0 | 1.85 |
| W. Example 3 | 20.0 | 3 | V: 30–40<br>H: 90–120 | 100 | 1.0–1.5 | 1.83 |
| W. Example 4 | 20.0 | 3 | V: 45–50<br>H: 60–75 | 170 | 2–3 | 1.79 |
| C. Example | 0.0 | 5 | V: 20–25<br>H: 70–75 | 100 | 3–4 | 1.80 |

*V: Vertical Direction, H: Horizontal Direction

Review of the above-identified table reveals that the carbon—carbon composite for friction products prepared in Working Example 1 exhibits excellent wear resistance and increased heat conductivity in a horizontal direction, as compared with the carbon—carbon composite of the comparative example. It can be further appreciated in the table that the carbon—carbon composite produced in Working Example 2 is excellent in wear resistance, vertical direction heat conductivity and density. The carbon—carbon composite of Working Example 3 exhibits excellent wear resistance and increased horizontal heat conductivity, whereas the carbon—carbon composite prepared in Working Example 4 shows a substantial increase in horizontal heat conductivity and shear strength which is as high as 170 MPa.

This means that the carbon fabrics and the prepregs employed in the instant invention play a key role in increasing the shock strength and the heat conductivity in a direction parallel to the friction surface. The carbon fibers act to improve the wear resistance and the heat conductivity in a direction perpendicular to the friction surface. The graphite powder serves not only to increase the wear resistance and the vertical direction heat conductivity but also to help shorten the densification process.

While the invention has been described with reference to certain preferred embodiments, it should be apparent to those skilled in the art that many changes and modifications may be made without departing from the scope of the invention as defined in the claims.

What is claimed is:

1. A method of making a carbon—carbon composite for friction products, comprising the steps of: alternatingly piling up layers of a mixture of carbon fibers, pitch powder and graphite powder and layers of one member selected from the group consisting of carbon fabrics, carbon-based prepregs and carbon-based, segmented prepregs one above the other so that there is provided a preform having a friction part containing the mixture of carbon fibers, pitch powder and graphite powder and a structure part supporting the friction part and containing a pack of alternating layers of the mixture and the one member selected from the group consisting of carbon fabrics, carbon-based prepregs and carbon based, segmented prepregs; heating and pressing the preform within a mold to obtain a green body; carbonizing the green body to prepare a carbonized body; impregnating the carbonized body with pitch powder and recarbonizing the impregnated body; and subjecting the impregnated and recarbonized body to chemical vapor infiltration with hydrocarbon gas.

2. The method of making a carbon—carbon composite for friction products as recited in claim 1, wherein said step of heating and pressing the preform is carried out at a temperature of 130–450° C.

3. The method of making a carbon—carbon composite for friction products as recited in claim 1, wherein said step of carbonizing the green body is performed under an inert gas atomosphere, with a pressure of no greater than 20 bar and at a temperature of 700–2000° C.

4. The method of making a carbon—carbon composite for friction products as recited in claim 1, wherein said step of impregnating and recarbonizing the carbonized body is performed under an inert gas atomosphere, with a pressure of no greater than 1 bar and at a temperature of 700–2500° C.

5. The method of making a carbon—carbon composite for friction products as recited in claim 1, wherein said step of impregnating and recarbonizing the carbon body is repeatedly carried out until the density of the carbon—carbon composite reaches a predetermined target value.

6. The method of making a carbon—carbon composite for friction products as recited in claim 1, wherein said mixture contains 10–70 wt % of carbon fibers, 30–60 wt % of pitch powder and 5–40 wt % of graphite powder.

7. The method of making a carbon—carbon composite for friction products as recited in claim 1, wherein said structure part contains 20–90 wt % of carbon fabrics and 10–70 wt % of carbon fibers.

8. The method of making a carbon—carbon composite for friction products, as recited in claim 1, wherein said carbon fibers are 0.1–150 mm long, said pitch powder has a particle size of no greater than 1.0 mm and said graphite powder has a particle size of 0.1 mm.

9. The method of making a carbon—carbon composite for friction products as recited in claim 1, wherein said carbon fabrics are selected from the group of plain fabrics, twill fabrics and satin fabrics.

10. The method of making a carbon—carbon composite for friction products as recited in claim 1, wherein said carbon-based prepregs and said carbon-based, segmented prepregs are pitch powder-impregnated carbon fabrics.

11. The method of making a carbon—carbon composite for friction products as recited in claim 1, wherein said carbon-based prepregs and said carbon-based segmented prepregs contain 5–60 wt % of pitch powder.

12. A method of making a carbon—carbon composite for friction products comprising the steps of; alternatingly piling up layers of one member selected from the group consisting of a carbon mat and a carbon felt, both of which are coated with pitch powder and graphite powder, and layers of carbon fabrics one above the other so that there is provided a preform having a friction part containing the one member selected from the group consisting of a carbon mat and a carbon felt and a structure part supporting the friction part and containing a pack of alternatingly layers of one member and the carbon fabrics; heating and pressing the preform within a mold to obtain a green body; carbonizing the green body to prepare a carbonized body; impregnating the carbonized body with pitch powder and recarbonizing the impregnated body; and subjecting the impregnated and recarbonized body to chemical vapor infiltration with hydrocarbon gas.

\* \* \* \* \*